G. B. SMITH.
MACHINE FOR ASSEMBLING BED FABRIC CHAINS.
APPLICATION FILED JULY 29, 1915. RENEWED OCT. 26, 1916.
1,227,972.
Patented May 29, 1917.
3 SHEETS—SHEET 1.
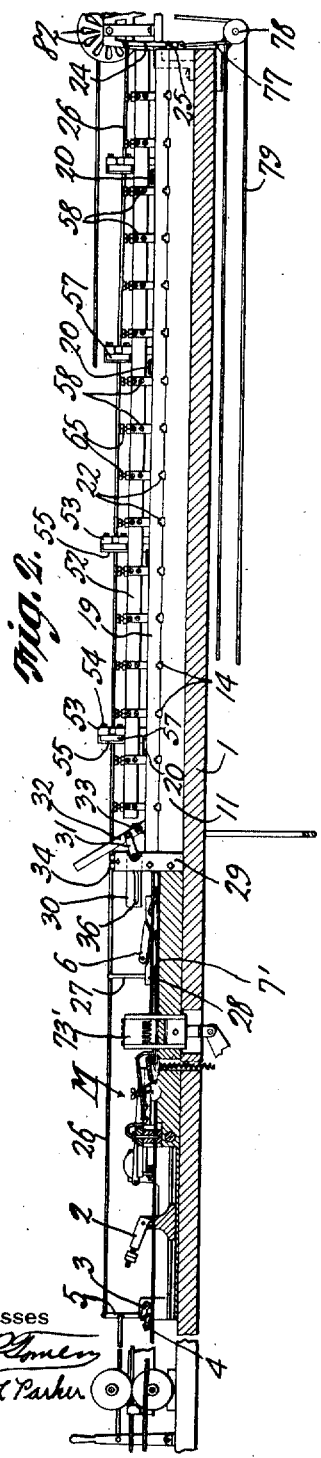
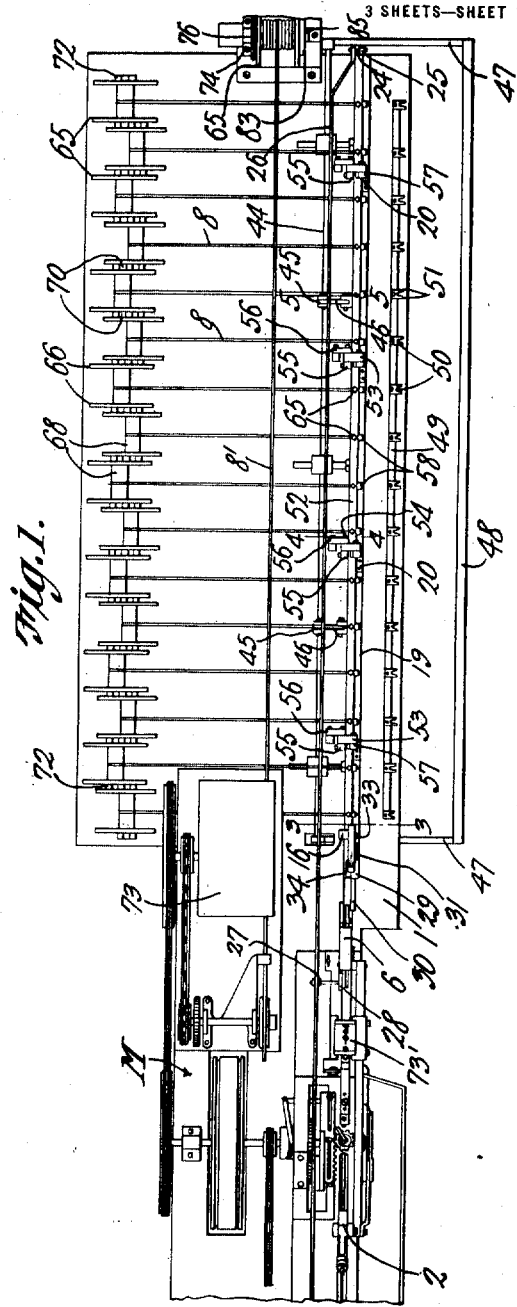
Witnesses
Gary B. Smith, Inventor
by C. A. Snow & Co.
Attorneys

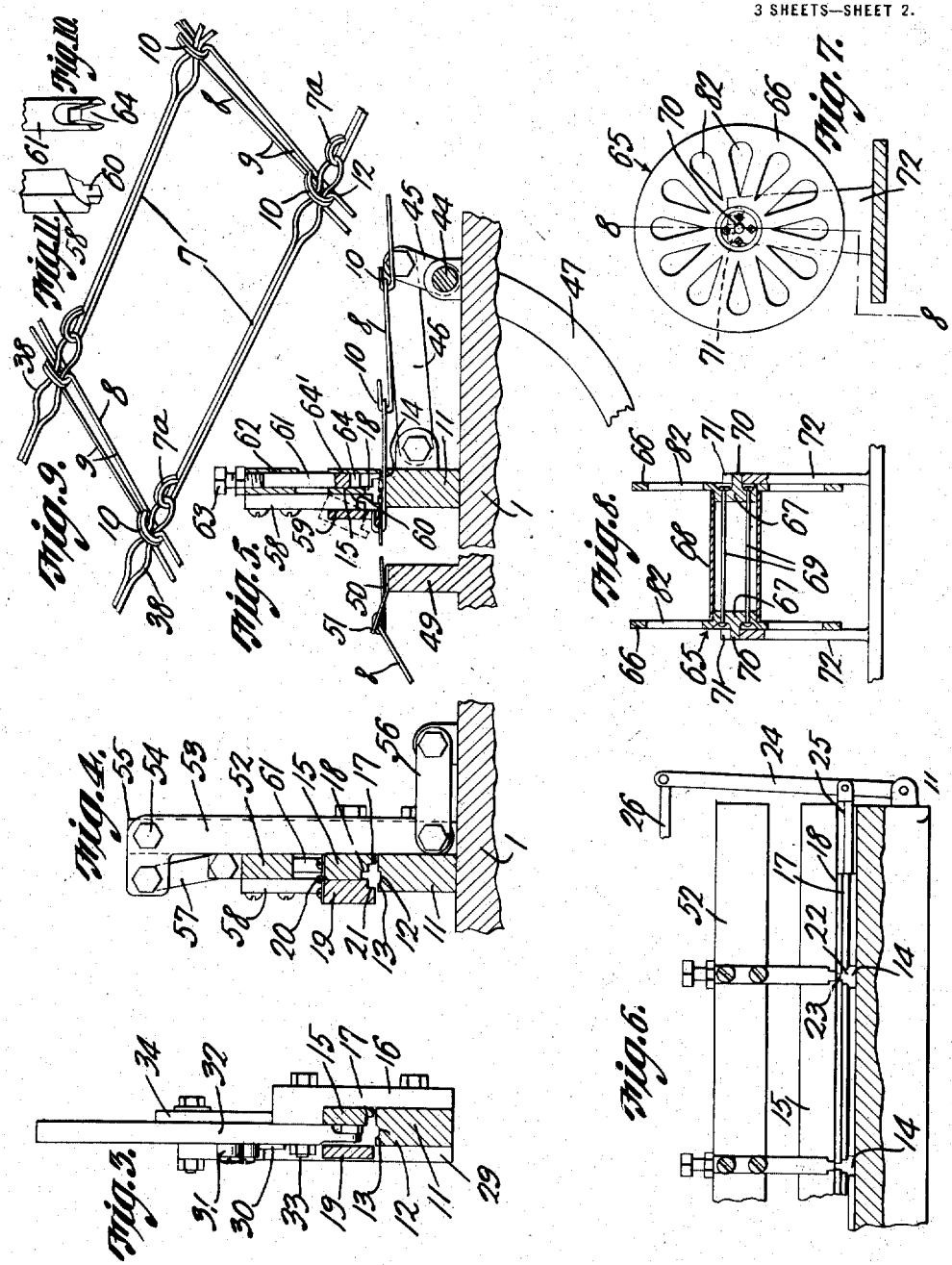

G. B. SMITH.
MACHINE FOR ASSEMBLING BED FABRIC CHAINS.
APPLICATION FILED JULY 29, 1915. RENEWED OCT. 26, 1916.
1,227,972.
Patented May 29, 1917.
3 SHEETS—SHEET 3.
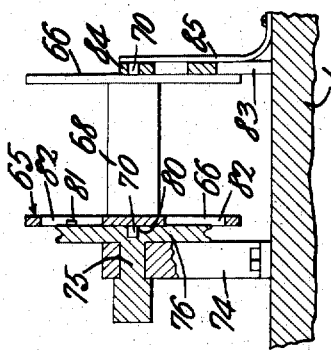
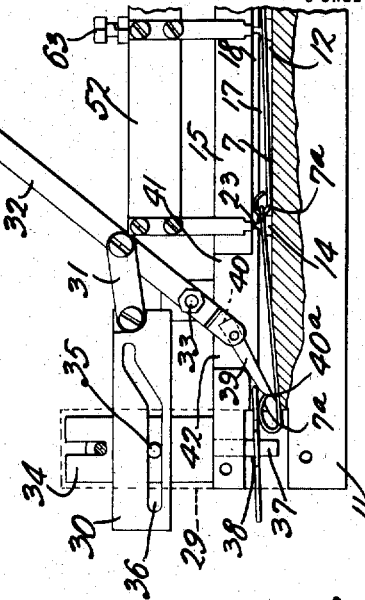
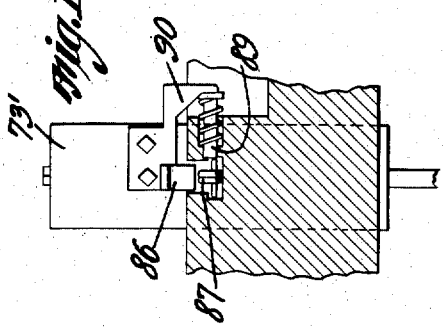
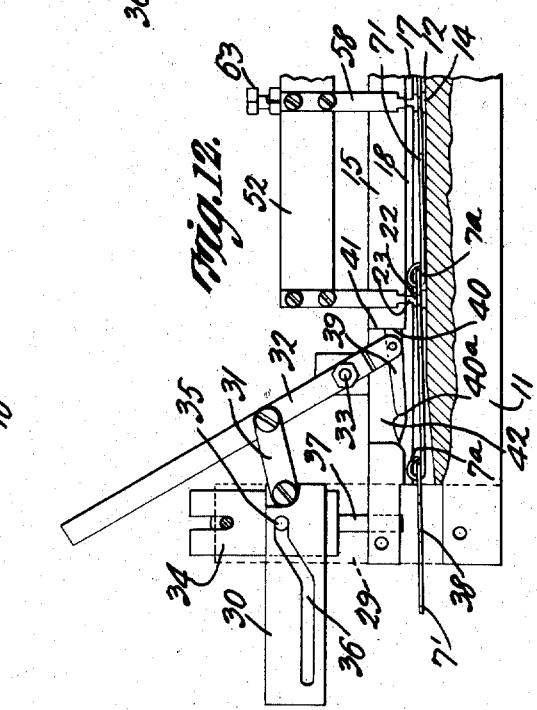
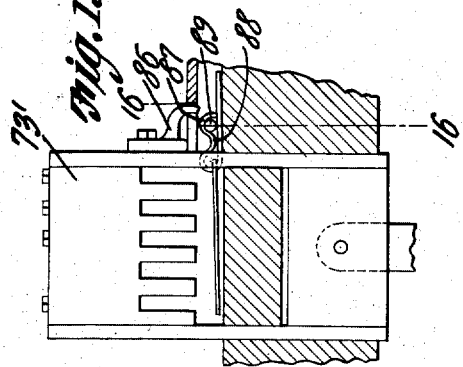
Witnesses
Gary B. Smith Inventor
by
Attorneys

UNITED STATES PATENT OFFICE.

GARY B. SMITH, OF CHICAGO, ILLINOIS.

MACHINE FOR ASSEMBLING BED-FABRIC CHAINS.

1,227,972. Specification of Letters Patent. Patented May 29, 1917.

Application filed July 29, 1915, Serial No. 42,517. Renewed October 26, 1916. Serial No. 127,965.

*To all whom it may concern:*

Be it known that I, GARY B. SMITH, a citizen of the United States, residing at Chicago, in the county of Cook and State of Illinois, have invented a new and useful Machine for Assembling Bed-Fabric Chains, of which the following is a specification.

The present invention is a machine for assembling the chains which go to make up a bed-spring fabric, and aims to provide a novel and improved apparatus for assembling longitudinal and cross chains.

The present assembling machine is adapted for use in connection with the machine for making bed fabric disclosed in my Patent No. 1,153,266, granted September 14, 1915, whereby said fabric making machine serves to deliver or feed longitudinal chains into the assembling machine for the assemblage and securement therewith of a plurality of cross chains, the present assembling machine having means for receiving the longitudinal chains one at a time and means for applying the cross chain links to the longitudinal chain.

Another object of the invention is the provision in a machine of the character indicated, of means for separating certain links of a continuous chain fed into the machine, whereby a predetermined length of chain delivered into the assembling machine will be severed for assemblage with the cross chains, and after which a new length of the continuous chain will be fed into the assembling machine, the operation being repeated until the desired width of bed fabric is obtained.

It is also within the scope of the invention to improve the assembling machine generally in its construction and details, to enhance the utility and efficiency thereof.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:—

Figure 1 is a plan view of the assembling machine combined with the bed-fabric making machine disclosed in the above-mentioned patent.

Fig. 2 is a view of the parts illustrated in Fig. 1, showing parts in elevation and other parts in longitudinal section, while other portions are broken away.

Figs. 3, 4 and 5 are enlarged cross-sectional views of the assembling machine, taken on the lines 3—3, 4—4 and 5—5 respectively, of Fig. 1.

Fig. 6 is an enlarged fragmental elevation illustrating means whereby the longitudinal chain fed into the assembling machine will stop the feeding mechanism.

Fig. 7 is an enlarged elevation of one of the cross chain reels.

Fig. 8 is a sectional view taken on the line 8—8 of Fig. 7.

Fig. 9 is a fragmental perspective view, on an enlarged scale, of the fabric.

Fig. 10 is an enlarged perspective detail of the die for bending the hooks of the cross chain links closed, one of said dies being employed for each cross chain.

Fig. 11 is an enlarged fragmental perspective view of one of the plungers for holding the respective cross chain against retrograde movement during the bending of the respective cross chain hooks.

Fig. 12 is an enlarged elevation of the device for severing the continuous chain, the parts being in normal position to allow the continuous chain to be fed into the assembling machine.

Fig. 13 is a view similar to Fig. 12 illustrating the parts in the act of severing the chain.

Fig. 14 is an enlarged fragmental detail illustrating one of the cross chain reels upon a mounting for receiving a chain from a machine for making or forming the cross chains.

Fig. 15 is an enlarged elevation of a die of the bed fabric making machine illustrating an attachment for forming the terminals of the chain links according to the disclosure in said patent.

Fig. 16 is a sectional view taken on the line 16—16 of Fig. 15.

As illustrated the assembling machine forming the subject-matter of the present application is assembled with the machine for making bed fabric disclosed in said patent, so that the machine serves to feed or deliver the continuous chain into the assembling machine. The machine M may be taken to typify a chain feeding or delivering mechanism of any sort, since it is possible to use the assembling machine with the machine M or any other suitable chain delivering or feeding mechanism. The machine M need not be illustrated or described in detail, and reference is only had to those parts of the machine which coöperate with the assembling machine. The machine M embodies a table or bed 1 which is also used for supporting the assembling machine, and the machine M has a wire feeding grip 2 controlled by a trip 3. The trip 3 is rendered inoperative by an arm 4 connected to a crank arm 5. The completed chain is delivered from the machine by a dog 6 which is engageable with the chain 7' for delivering it from the machine and into the assembling machine. The parts 1, 2, 3, 4, 5, and 6 above described are the parts designated by the respective reference numerals 2, 26, 17, 19, 20 and 88 in said patent, so that reference may be had to the said patent to assist in the understanding of the manner in which the chain 7' is formed and delivered.

In order that the operation of the assembling machine may be better understood, a brief description will now be given of the fabric formed by the assembling machine, this fabric being similar to the fabric disclosed in my Patent No. 1,149,793 issued August 10, 1915. The fabric embodies longitudinal chains 7 each having a series of connected links, and cross chains 8 are assembled with the longitudinal chains 7. Each of the cross chains 8 embodies a series of doubled wire links 9 having their terminals bent back into hooks 10 engaging the bends of the adjacent or companion links. The hooks 10 are open prior to the assemblage of the cross chains 8 with the longitudinal chains 7, but in the completed fabric, the hooks 10 are bent against the body portions of the links 9 to securely fasten the cross chain links to the links of the longitudinal chains. The assembling machine has been devised for assembling the longitudinal and cross chains in a convenient and efficient manner.

Taking up the assembling machine in detail, the frame embodies a longitudinal bar 11 normally alining with the machine M to receive the chain 7' therefrom, the bar 11 serving as a guide member for the chains 7' and also as an anvil for enabling the hooks of the cross chains to be bent closed. The bar 11 is disposed slidably upon the table or base 1 so that the bar 11 can be slid transversely or laterally. This lateral motion of the bar 11 is utilized for feeding the cross chains 8, to move the last longitudinal chain 7 out of the way, and also to cause the bending of the hooks of the cross chain links, as will hereinafter more fully appear. The bar 11 has an upper longitudinal groove 12 for receiving the bends of the hooks 7ª of the longitudinal chain links, the longitudinal chains being slid longitudinally over or upon the bar 11 from the machine M. One side wall of the groove 12 is inclined, as at 13, to permit of the ready movement of the cross chain links and the longitudinal chain off of the bar 1. The upper edge of the bar 11 is provided with a longitudinal series of suitably spaced grooves or channels 14 intersecting the groove or channel 12, and the grooves 14 are for the passage and guidance of the cross chains 8 over the bar 11.

A second longitudinal bar 15 is disposed immediately above one side portion of the bar 11, and is rigidly attached to said bar 11 by means of stays or members 16 bolted or otherwise attached to the bars 11 and 15. These bars 11 and 15 are horizontal and parallel, and are spaced slightly apart. The lower edge of the bar 15 has a longitudinal rabbet 17 for the passage of the longitudinal chain 7, and to guide said longitudinal chain for proper longitudinal movement upon the bar 11. The bar 15 also has a secondary longitudinal rabbet 18 adjacent the rabbet 17 for receiving the upper portions of the hooks 7ª of the longitudinal chain links. The rabbet 18 is disposed above the groove or channel 12.

A third bar 19 is disposed at one side of and normally bears against the bar 15 above the respective side portion of the bar 11, and the upper edge of the bar 19 is connected by hinges 20 with the upper edge of the bar 15, whereby the bar 19 is hung or suspended at one side of the bar 15 for movement away from said bar 15 when necessary. The lower or free edge of the bar 19 has a longitudinal rabbet 21 coöperating with the rabbet 17 of the bar 15 for receiving and guiding the longitudinal chain 7 upon the bar 11. The coöperating bars 11, 15 and 19 are thus provided with a suitable passage therebetween for the proper guidance of the longitudinal chain for longitudinal movement into the assembling machine, without danger of the links of the longitudinal chain being displaced out of alinement.

The lower edges of the bars 15 and 19 are provided with complementing or alining notches or recesses 22 above and coöperating with the transverse grooves or channels 14 of the bar 11, whereby the cross chains will pass properly through the grooves 14 and notches 22. The notches 22 have supplemental notches 23 for the passage of the hooks 10 of the cross chains 8. The cross chains are thus guided for proper movement across the bar 11. It will of course be understood that the grooves 14 and notches 22 are properly arranged or spaced according to the spacing of the cross chains 8 when necessary, so that the cross chains will be properly assembled with the links of the longitudinal chains.

It may be stated at this point, that the bar 11 normally alines with the machine M to receive the chain 7' delivered or fed by the machine M, the continuous chain 7' being pushed lengthwise onto the bar 11 below the bars 15 and 19. When a predetermined length of the continuous chain 7' is delivered into the assembling machine, it is essential that the feeding of the chain 7' be stopped, so that a portion of the continuous chain 7' between the bars 11 and 15—19 can be severed to provide one of the longitudinal chains 7 of the fabric and to allow said longitudinal chain 7 to be assembled with the cross chains.

The device for stopping or arresting the feeding of the chain 7' embodies a lever 24 fulcrumed or pivoted to that end of the bar 11 remote from the machine or chain feeding mechanism M, and a plunger 25 is pivoted to the lever 24 and projects slidably into the passage provided by the bars 11, 15 and 19. The lever 24 is connected by a rod or link 26 to the crank arm 5 of the mechanism M, and the link 26 is also connected, as at 27, to a cam 28 coöperable with the dog 6 of the machine M. Consequently, when the chain strikes the plunger 25 after being fed to the desired length into the assembling machine, the plunger 25 is forced outward, thereby swinging the lever 24. This will pull the rod or link 26, causing the arm 4 to be raised to render the trip 3 inoperative, and which will prevent the operation of the wire feeding grip 2, as will be clearly obvious by reference to the aforesaid Patent No. 1,153,266. Furthermore, when the rod 26 is pulled by the movement of the lever 24, the wedge 28 is moved or projected under the dog 6, and this prevents the dog 6 from dropping into engagement with the chain 7', so that the movement of the dog cannot deliver the chain 7'. It should therefore be obvious that when the desired length of chain is delivered into the assembling machine, the chain feeding mechanism is rendered inoperative.

The contrivance for severing the chain 7' at the receiving end of the assembling machine is illustrated in detail in Figs. 3, 12 and 13, and embodies a standard 29 carried by that end of the bar 11 adjacent the machine M, and a longitudinally slidable cam member 30 is carried by the standard 29 above the bar 11. One end of the member or slide 30 is connected by a link 31 to a lever 32 fulcrumed, as at 33, above the bar 15. A vertically slidable plunger 34 is also carried by the standard 29 adjacent the slide 30, and is provided with an outstanding lug or pin 35 working in a cam slot 36 provided in the slide 30, whereby when the slide 30 is reciprocated, the plunger 34 will be reciprocated vertically. The plunger 34 has a lower depending finger 37 to pass or project tightly through the loop 38 of the respective link of the chain 7', whereby the said link will stick to and be held by the finger 37. The plunger 34 is normally raised so as to retract the finger 37 out of the path of the chain. A chisel or wedge 39 is pivoted to the lower end or arm of the lever 32, and is provided with a square or blunt butt end 40 normally seating against a shoulder 41 formed by a recess 42 in the bar 15 in which the chisel 39 is disposed. The chisel 39 has an upper notch or shoulder 40$^a$ adjacent its sharp end. When the lever 32 is swung to the position illustrated in Fig. 12, the slide 30 is moved to raise the plunger 34, and the butt end of the chisel 39 is brought against the shoulder 41, thereby raising the sharp end of the chisel out of the path of the chain.

The operation of the severing mechanism is as follows: When the desired length of the continuous chain 7' is delivered into the assembling machine, so that the machine or feeding mechanism M is stopped, the lever 32 is swung by the hand whereby the slide 30 is pulled by the lever 32, causing the plunger 34 to be forced downwardly. This will force the finger 37 through the underlying loop 38, it being understood that the parts of the severing mechanism are properly disposed so as to perform the desired functions. When the lever 32 is swung, the butt end of the chisel 39 leaves the shoulder 41 and this allows the free end of the chisel 39 to drop onto the underlying link. The finger 37 being forced through the respective loop 38, will prevent the backward or retrograde movement of the respective links, as would be objectionable, and when the movement of the lever 32 is completed, the sharp or free end of the chisel 39 is slid and forced under the respective hook 7$^a$ of the chain. Said hook 7$^a$ is therefore bent upward so as to open the same, and the longitudinal movement of the chisel 39 will carry the respective link of the chain backwardly, as indicated in Fig. 13, and at the same time, the link held by the finger 37 is raised by the swinging movement of the chisel 39 while sliding upon the respective link, so that the links of the chain acted upon by the finger 37 and chisel 39 are separated. The end of the released hook $7^a$ springs into the notch $40^a$ to cause the hook $7^a$ to be frictionally held by the chisel. In this manner, when the desired length of continuous chain 7' is severed to provide one of the longitudinal chains 7 of the fabric, and this chain 7 can then be moved laterally for assemblage with or attachment to the cross chains. When the lever 32 is swung back the finger 37 is retracted to release the links held thereby and the chain 7 is moved back into proper position upon the bar 11 since the book $7^a$ which sticks to the chisel will cause the chain 7 to be so moved. When the chain 7 is stopped by the plunger 25, the chisel is withdrawn from the respective link and is finally raised out of the way.

The bar 11 is then moved laterally to carry the chain 7 with it and during the movement of the bar 11, the link previously held by the finger 37 is held in place by the machine M so that when the bar 11 is returned to normal position, the chain 7' will be properly fed onto it as before.

The device for moving the bar 11 is operated manually, and to this end a longitudinal rock shaft 44 is journaled upon the table 1 at one side of the bar 11, and has upwardly projecting arms 45 connected by links 46 with the bar 11. The shaft 44 also has arms 47 projecting below the table 1, and to one side thereof, and the arms or levers 47 are connected by a longitudinal bar 48 at one side of the machine, whereby the bar 48 may be readily depressed by hand at any point thereof, for rotating the shaft 44, so that the link 46 will push the bar 11 laterally out of alinement with the machine M.

The table or frame 1 is provided at that side of the bar 11 opposite the shaft 44 with an upstanding longitudinal flange 49, and catches 50 are secured upon the upper edge of the flange 49, there being one catch 50 for each groove 14. The catches 50 have bifurcated portions or prongs 51 projecting away from the bar 11, and the cross chains 8 slide over the catches 50 between the prongs 51 thereof, whereby said prongs are engageable with the joints of the cross chain links to prevent the return or backward movement of the cross chains when the bar 11 is moved away from the flange 49. The cross chains 8 pass through the grooves 14 and notches 22 and thence over the flange 49 between the prongs 51, so that the cross chains are fed or delivered over the flange 49 and its catches by the movement of the bar 11. The prongs 51 also engage over the longitudinal chains 7 for preventing the retrograde movement of the fabric.

Assembled with the bars 11, 15 and 19 is a device for clenching or bending the hooks of the cross chain links. This device embodies a longitudinal horizontal bar 52 mounted slidably above the bar 15, and reciprocated vertically by means of bell-crank levers 53 which are fulcrumed, as at 54, to standards or posts 55 attached to the bars 11 and 15. The long arms of the levers 53 project downwardly at one side of the bars 11, 15 and 52, and the lower ends of said long arms are connected by links 56 with the table or base 1. The short arms of the bell-crank or L-shaped levers 53 project over the bar 52 and are connected by links 57 with the said bar. When the bar 11 is slid upon the table 1 toward the flange 49, the long arms of the levers 53, being tied or anchored to the table by the links 56, will cause the levers 53 to be swung relative to the standards 55, and the links 57 will be forced downwardly to thereby depress the bar 52. When the bar 11 is returned, the bar 52 is naturally raised.

Downwardly projecting plungers 58 are secured to the bar 52 and are slidable through channels or recesses 59 provided in the inner side of the bar 19 whereby the bar 19 can swing without interference. The lower ends of the plungers 58 are formed, as at 60, so as to engage or abut against the bend of the hooks 10 of the links 9 to prevent the displacement of the hooks when being bent. There is one plunger for each groove 14. Adjacent each plunger 58, the bar 52 carries a downwardly projecting die 61 which has its upper end tightly received by a core 62 provided in the bar 52, adjusting screws 63 being threaded in the upper ends of the bores 62 for forcing the dies 61 downwardly to the desired position. The lower ends of the dies 61 are bifurcated, as at 64, to straddle and bend the hooks of the cross chains, whereby the cross chain hooks are bent closed or clenched. The dies 61 slide freely through vertical bores 64' provided in the bar 15. The dies 61 and plungers 58 are disposed above and movable to and from the lower bar 11.

Each of the cross chains 8 is wound upon a reel 65 comprising side plates or strips 66 having central inwardly projecting hubs or bosses 67 engaging in the ends of a sleeve 68, and bolts 69 are engaged through the bosses 67 for clamping the parts together. The plates 66 have central outstanding trunnions 70 normally seated in the notches 71 provided in the upper ends of standards 72 carried by the table 1 at the respective sides thereof. There is but a single standard 72 between each pair of reels having a pair of notches 71 and the reels may be readily removed and replaced when they are emptied and refilled, respectively.

A machine 73 for forming or making cross chains is perfectly operatively connected to the machine M, and the chain 8' turned out by the machine 73 is wound up upon one of the reels 65, as illustrated in Fig. 1. When this reel 65 is filled, it can be removed and substituted for by one of the reels 65 which is emptied, and the cross chains may thus be supplied to the assembling machine. The mounting for the reel 65 which receives the chain 8' from the machine 73 is illustrated in detail in Fig. 14. Thus, there is provided a standard 74 carried by the table 1 and having a short shaft or spindle 75 journaled therethrough, and said shaft 75 is provided at one side with a pulley wheel 76 which is connected by a belt 77 with a pulley wheel 78 and this pulley wheel 78 is in turn connected as at 79, with one part (not shown) of the machine M, so that the reel 65 will be properly rotated for winding up the chain 8' thereon. The pulley wheel 76 has an outstanding lug or pin 81 engaged in one of the openings 82 in the respective side plates 66 of the reel for causing the reel to rotate with the pulley wheel. The pulley wheel 76 has a central socket 80 for receiving one of the trunnions 70, and the other trunnion 70 is received by an aperture or socket 84 of a slidably mounted standard 83. The standard 83 is attached to a spring 85 which normally moves the standard 83 into engagement with the reel 65, but the standard 83 can be swung or moved outwardly to allow the reel to be removed and replaced by an empty one.

In Figs. 15 and 16, there is illustrated an attachment for the machine M for bending the terminals of the longitudinal chain links according to the disclosure in my Patent No. 1,153,266. The attachment embodies a supplemental or auxiliary die 86 attached to the die 73', of the machine, and said die 73' being the same as the die designated 73 in my said patent. The die 86 is so formed as to provide the bends 87 and 88 in the terminals of the links. To facilitate the forming of the bends 87 and 88, a spring-pressed anvil pin 89 is carried by the frame, and is operated by a cam 90 attached to the die 73'. The cam 90 is arranged to project the pin 89 across the respective link when the die 73' is depressed, whereby the die 86 in moving over the terminals of the link and the pin 89, will properly form the bends 87 and 88. If the bends 87 and 88 are used in the longitudinal chains, the severing mechanism illustrated in Figs. 12 and 13 must be modified accordingly to permit of sufficient movement of the parts for properly detaching the links.

The operation of the assembling machine is as follows: The guide formed by the bars 11, 15 and 19 normally alines with the chain forming machine M to receive the chain 7' delivered therefrom. The lever 32 is normally swung toward the machine M so that the plunger 34 is raised as well as the chisel 39 to prevent interference with the chain 7' in its movement from the machine M. Now, when a predetermined length of the continuous chain 7' is pushed into the assembling machine, the end of the chain will strike the plunger 25 and this will serve to automatically stop the feeding of the chain, since the lever 24 being swung by the movement of the plunger 25 will pull the rod 26 and this will cause the grip 2 and dog 6 as well as the feed rolls to be rendered inoperative. Consequently, the formation and delivery of the chain 7' will be stopped. The chain 7' is then severed manually, by swinging the lever 32 away from the machine M, whereby the plunger 34 is depressed by the slide 30 to cause the finger 37 to project tightly through the respective loop 38 of one link, while the chisel 39 is thrust under the respective hook 7ª to unbend or pry the same upwardly and to then force said hook out of engagement with the companion or adjacent link held by the finger 37. The chain 7' is thus severed to provide the longitudinal chains 7 of the fabric upon the bar 11. The lever 32 is then swung back to release the link held by the finger 37 and to return the chain to proper position, and also to release the chisel from the chain. Since the cross chains 8 pass through the grooves 14, the longitudinal chain 7 will be slid over the cross chains 8 in front of the respective hooks 10 of the cross chains. The bar 11 and parts carried thereby are then slid laterally toward the flange 49, this being accomplished by depressing the hand bar 48 manually, so that the shaft 44 is rocked to thrust the links 46 toward the flange 49. The chain 7 upon the bar 11 is thus carried laterally therewith, and is moved into the respective hooks 10 of the cross chains whereby the cross chains are pulled with the bar 11, the cross chains being unwound from the reels 65. When the bar 11 is moved toward the flange 49, the bar 52 is moved downwardly toward the bar 11 and the plungers 58 are thereby moved downwardly into abutment with the bends of the hooks 10 while the dies 61 engage and bend the bills of the hooks 10 downwardly against the body portions of the links 9 to thereby embrace the links of the longitudinal chain 7. The plungers 58 in engaging the bends of the hooks will prevent the cross chain links from being displaced by the action of the dies 61 upon the hooks. When the bar 11 is moved laterally approximately the length of one of the cross chain links, the cross chains are forced across the flange 49, and one of the longitudinal chains 7 is moved over the prongs 51 of the catches 50 to prevent the retrograde movement of the fabric, since the said chain 7 in engaging under the prongs 51 will prevent this. The movement of the bar 11 not only results in the fabric being fed toward one side, but also results in the clenching or bending of the hooks around the longitudinal chain 7 carried by the bar 11, and the bar 11 is then returned into normal position to receive a longitudinal chain. When the bar 11 is returned to normal position by raising the hand bar 48, the bar 11 is drawn backwardly under the cross chains 8, and the dies 61 and plungers 58 are raised or retracted by the upward movement of the bar 52. The bar 19 can swing to the dotted line position illustrated in Fig. 5 during the return movement of the bar 11, so that the bar 19 can pass the chain 7 which leaves the bar 11. The bar 19 however, normally swings downwardly into proper relation with the bars 11 and 15. The inclined wall 13 of the groove 12 allows the longitudinal chain 7 to readily move off of the bar 11 when the bar 11 is returned. During the movement of the bar 11, the last link of the chain 7' which projects from the machine M is held in place by said machine to prevent the displacement of the said link, and to properly direct the said link onto the bar 11 when the bar 11 is returned to normal position. When the bar 11 is returned, the rod 26 is moved in the proper direction to again bring the grip 2, dog 6 and feed rolls of the machine M into operation for delivering the chain into the present assembling machine. The operation is then repeated, and is continued until the desired width of fabric is obtained.

The present machine operates to project a continuous chain across the cross chains, in which event, the continuous chain is severed to provide a longitudinal chain, said longitudinal chain then being engaged to the hooks of the cross chains, whereupon said hooks are bent to embrace the longitudinal chain. Finally, the fabric is moved laterally to receive the succeeding longitudinal chain, the operation being repeated until the desired width or length of fabric is produced.

Plungers 25 of different lengths may be employed, whereby a plunger 25 of desired length can be used so as to project sufficiently into the guide for the chain 7' to stop the chain feeding mechanism when a predetermined length of chain enters the guide. In this manner, the device is adjustable for longitudinal chains of different lengths, because the longer the plunger 25 is, the shorter will be the amount of chain permitted to enter the guide.

The assembling machine can also be used for assembling the fabric disclosed in my co-pending application Serial No. 41,293 filed July 22, 1915.

Having thus described the invention, what is claimed as new is:

1. A chain-fabric assembling machine embodying a guide for receiving a longitudinal chain and coöperable with cross chains, and means for moving the guide and cross chains relative to one another to engage the longitudinal chain to hooks of the cross chains.

2. A chain-fabric assembling machine embodying a guide for receiving a longitudinal chain and coöperable with cross chains, means for moving the guide and cross chains relative to one another to engage the longitudinal chain to hooks of the cross chains, and means for bending the hooks to embrace the longitudinal chain.

3. A chain-fabric assembling machine embodying a guide for receiving a longitudinal chain, and to coöperate with cross chains having hooks, means for moving said guide and cross chains relative to one another to carry the longitudinal chain into the hooks of the cross chains and to deliver the fabric to one side, and means for preventing the retrograde movement of the fabric.

4. A chain-fabric assembling machine embodying a guide for receiving a longitudinal chain, and to coöperate with cross chains having hooks, means for moving said guide and cross chains relative to one another to carry the longitudinal chain into the hooks of the cross chains and to deliver the fabric to one side, means for preventing the retrograde movement of the fabric, and means for bending the hooks to embrace the longitudinal chain.

5. A chain-fabric assembling machine embodying a laterally movable guide for receiving a longitudinal chain and coöperable with cross chains having hooks, and means for moving said guide to carry the longitudinal chain into the hooks of the cross chains.

6. A chain-fabric assembling machine embodying a laterally movable guide for receiving a longitudinal chain and coöperable with cross chains having hooks, means for moving said guide to carry the longitudinal chain into the hooks of the cross chains, and means for bending said hooks to embrace the longitudinal chain.

7. A chain-fabric assembling machine embodying a laterally movable guide for receiving a longitudinal chain, and coöperable with cross chains having hooks, means for moving said guide to carry the longitudinal chain into the hooks of the cross chains, and means carried by the guide for bending said hooks to embrace the longitudinal chain.

8. A chain-fabric assembling machine embodying a laterally movable guide for receiving a longitudinal chain, and coöperable with cross chains having hooks, means for moving said guide to carry the longitudinal chain into the hooks of the cross chains, means for bending said hooks to embrace the longitudinal chain, and means at one side of the guide and coöperable with the fabric delivered from the guide for preventing retrograde movement of the fabric.

9. A chain-fabric assembling machine embodying a laterally movable guide for receiving a longitudinal chain, and coöperable with cross chains having hooks, means for moving said guide to carry the longitudinal chain into the hooks of the cross chains, means carried by the guide for bending said hooks to embrace the longitudinal chain, and means at one side of the guide and coöperable with the fabric delivered from the guide for preventing the retrograde movement of the fabric.

10. A chain-fabric assembling machine embodying coöperating means for guiding a longitudinal chain across cross chains having hooks and for moving the longitudinal and cross chains relative to one another to bring the longitudinal chain into the hooks of the cross chains.

11. A chain-fabric assembling machine embodying means for guiding a longitudinal chain across cross chains having hooks and for moving the longitudinal and cross chains relative to one another to bring the longitudinal chain into the hooks of the cross chains, and means for bending the hooks of the cross chains to embrace the longitudinal chain.

12. A chain-fabric assembling machine embodying coöperating means for guiding a longitudinal chain across cross chains having hooks and then moving the longitudinal chain laterally relative to the cross chains to bring the longitudinal chain into the hooks of the cross chains.

13. A chain-fabric assembling machine embodying means for guiding a longitudinal chain across cross chains having hooks and then moving the longitudinal chain laterally relative to the cross chains to bring the longitudinal chain into the hooks of the cross chains, and means for bending the hooks of the cross chains to embrace the longitudinal chain.

14. A chain-fabric assembling machine embodying a guide having a longitudinal passage for the reception of a longitudinal chain and having transverse passages for the reception of cross chains having hooks, and means for moving said guide and cross chains relative to one another to carry the longitudinal chain into the hooks of the cross chains.

15. A chain-fabric assembling machine embodying a guide having a longitudinal passage for the reception of a longitudinal chain and having transverse passages for the reception of cross chains having hooks, means for moving said guide and cross chains relative to one another to carry the longitudinal chain into the hooks of the cross chains, means for bending the hooks to embrace the longitudinal chains, and means for preventing the retrograde movement of the fabric delivered from the guide.

16. A chain-fabric assembling machine embodying a transversely movable guide having a longitudinal passage for the reception of a longitudinal chain and having transverse passages intersecting said longitudinal passage for the passage of cross chains having hooks, and means for moving said guide transversely to carry the longitudinal chain into the hooks of the cross chains.

17. A chain-fabric assembling machine embodying a transversely movable guide having a longitudinal passage for the reception of a longitudinal chain and having transverse passages intersecting said longitudinal passage for the passage of cross chains having hooks, means for moving said guide transversely to carry the longitudinal chain into the hooks of the cross chains, and means carried by the guide for bending the hooks of the cross chains to embrace the longitudinal chain.

18. A chain-fabric assembling machine embodying a transversely movable guide having a longitudinal passage for the reception of a longitudinal chain and having transverse passages intersecting said longitudinal passage for the passage of cross chains having hooks, means for moving said guide transversely to carry the longitudinal chain into the hooks of the cross chains, and means carried by the guide for bending the hooks of the cross chains to embrace the longitudinal chain during and operated by the movement of the guide.

19. A chain-fabric assembling machine comprising a guide having a longitudinal passage for the reception of a longitudinal chain and having transverse passages for the reception of cross chains having hooks, a member at one side of said guide, the said guide and member being movable toward and away from one another, and means for moving said guide and member relative to one another whereby the longitudinal chain is moved into the hooks of the cross chains, and catches carried by said member and coöperable with the fabric delivered by said guide over said member for preventing the retrograte movement of said fabric.

20. A chain-fabric assembling machine comprising a guide having a longitudinal passage for the reception of a longitudinal chain and having transverse passages for the reception of cross chains having hooks, a member at one side of said guide, the said guide and member being movable toward and away from one another, means for moving said guide and member relative to one another whereby the longitudinal chain is moved into the hooks of the cross chains, catches carried by said member and coöperable with the fabric delivered by said guide over said member for preventing the retrograde movement of said fabric, and means for bending the hooks of the cross chains to embrace the longitudinal chain.

21. A chain-fabric assembling machine embodying a member having catches, a laterally movable guide movable to and from said member and having a longitudinal passage for receiving a longitudinal chain and also having transverse passages for the passage therethrough of cross chains having hooks, said cross chains being delivered from said guide over said member, and means for moving said guide to bring the longitudinal chain carried thereby into the respective hooks of the cross chains and to move the cross chains over said member, the catches preventing the retrograde movement of the fabric.

22. A chain-fabric assembling machine embodying a member having catches, a laterally movable guide movable to and from said member and having a longitudinal passage for receiving a longitudinal chain and also having transverse passages for the passage therethrough of cross chains having hooks, said cross chains being delivered from said guide over said member, means for moving said guide to bring the longitudinal chain carried thereby into the respective hooks of the cross chains and to move the cross chains over said member, the catches preventing the retrograde movement of the fabric, and means for bending said hooks to embrace the respective longitudinal chain.

23. A chain-fabric assembling machine embodying a member having catches, a laterally movable guide movable to and from said member and having a longitudinal passage for receiving a longitudinal chain and also having transverse passages for the passage therethrough of cross chains having hooks, said cross chains being delivered from said guide over said member, means for moving said guide to bring the longitudinal chain carried thereby into the respective hooks of the cross chains and to move the cross chains over said member, the catches preventing the retrograde movement of the fabric, and means for bending said hooks to embrace the respective longitudinal chain during and by the movement of the guide.

24. In a chain-fabric assembling machine, a guide having a longitudinal passage for the reception of a longitudinal chain and having transverse passages for the passage of cross chains having hooks to receive the longitudinal chain, said guide having a hinged portion to allow the longitudinal chain to leave the same.

25. In a chain-fabric assembling machine, a guide comprising a lower bar and a pair of upper bars above the same, one of said upper bars being hinged to the other to swing away from the same, the lower bar having an upper longitudinal groove and upper transverse grooves intersecting the longitudinal groove, the upper bars having lower rabbets coöperating with the longitudinal groove of the lower bar for receiving a longitudinal chain, and the lower edges of the upper bars having notches coöperating with the transverse grooves of the lower bar for the passage of cross chains therethrough.

26. In a chain-fabric assembling machine, a guide having a longitudinal passage for receiving a longitudinal chain having transverse passages for the passage of cross chains therethrough having hooks to engage the longitudinal chain, and dies carried by the guide and adapted for bending the hooks of the cross chains to embrace the longitudinal chain.

27. In a chain-fabric assembling machine, a guide having a longitudinal passage for receiving a longitudinal chain having transverse passages for the passage of cross chains therethrough having hooks to engage the longitudinal chain, dies carried by the guide and adapted for bending the hooks of the cross chains to embrace the longitudinal chain, and means for moving the dies downwardly and upwardly.

28. In a chain-fabric assembling machine, a guide having a longitudinal passage for receiving a longitudinal chain having transverse passages for the passage of cross chains therethrough having hooks to engage the longitudinal chain, dies carried by the guide and adapted for bending the hooks of the cross chains to embrace the longitudinal chain, the guide being movable transversely, and means for moving the dies downwardly and upwardly during the movement of the guide.

29. In a chain-fabric assembling machine, a guide having a longitudinal passage for receiving a longitudinal chain and having transverse passages for the passage of cross chains having hooks to engage the longitudinal chain, means for bending the hooks to embrace the longitudinal chain, and means for preventing the displacement of the hooks during the bending thereof.

30. In a chain-fabric assembling machine, a guide having a longitudinal passage for the reception of a longitudinal chain and having transverse passages for the passage of cross chains therethrough having hooks to engage the longitudinal chain, movable dies carried by the guide and adapted to bend the hooks of the cross chains to embrace the longitudinal chain, and members carried by the guide and engageable with the bends of the hooks to prevent the displacement of the hooks during the bending thereof.

31. In a chain-fabric assembling machine, a guide having a longitudinal passage for the reception of a longitudinal chain and having transverse passages for the passage of cross chains therethrough having hooks to engage the longitudinal chain, dies slidably carried by the guide for bending the hooks of the cross chains to embrace the longitudinal chain, plungers slidably carried by the guide and engageable with the bends of the hooks to prevent the displacement of the hooks during the bending thereof, and means for simultaneously sliding said dies and plungers.

32. In a chain-fabric assembling machine, a guide having a longitudinal passage for the reception of a longitudinal chain and having transverse passages for the passage of cross chains therethrough having hooks to engage the longitudinal chain, dies slidably carried by the guide for bending the hooks of the cross chains to embrace the longitudinal chain, plungers slidably carried by the guide and engageable with the bends of the hooks to prevent the displacement of the hooks during the bending thereof, and means for simultaneously sliding said dies and plungers, the guide having a hinged portion to permit the longitudinal chain to move out of the guide, and said hinged portion having channels receiving said plungers.

33. A chain-fabric assembling machine, embodying means for feeding a continuous chain across a number of cross chains having hooks, means for severing the continuous chain when a predetermined length thereof is fed across the cross chains, and means for then moving the longitudinal and cross chains relative to one another to engage the longitudinal chain with the hooks of the cross chains.

34. A chain-fabric assembling machine, embodying means for feeding a continuous chain across a number of cross chains having hooks, means for severing the continuous chain when a predetermined length thereof is fed across the cross chains, means for then moving the longitudinal and cross chains relative to one another to engage the longitudinal chain with the hooks of the cross chains, and means for then bending the hooks to embrace the longitudinal chain.

35. A chain fabric assembling machine, embodying means for feeding a continuous chain across a number of cross chains having hooks, means for stopping the feeding of the continuous chain when a predetermined length thereof is moved across the cross chains, means for then severing the continuous chain to provide a longitudinal chain for assemblage with the cross chains, means for moving the longitudinal and cross chains relative to one another to engage the longitudinal chain with the hooks of the cross chains, and means for then bending said hooks to embrace the longitudinal chain.

36. A chain-fabric assembling machine, embodying a guide having a longitudinal passage and transverse passages for the passage of cross chains therethrough having hooks, means for feeding a continuous chain into said longitudinal passage, means for severing the continuous chain when a predetermined length thereof is fed into the guide, means for moving the guide and cross chains relative to one another to engage said length of continuous chain with the hooks of the cross chains, and means for bending said hooks.

37. A chain-fabric assembling machine embodying a guide having a longitudinal passage and transverse passages intersecting said longitudinal passage for the passage of cross chains through the transverse passages, means for feeding a continuous chain into the longitudinal passage of the guide, means for stopping the feeding of the continuous chain when a predetermined length of the continuous chain is fed into said longitudinal passage, means for then severing the continuous chain to provide a longitudinal chain for assemblage with the cross chains, means for moving the guide and cross chain relative to one another to move the longitudinal chain into the hooks of the cross chains, and means for bending said hooks to embrace the longitudinal chains.

38. In a machine of the character described, a guide having a passage for a continuous chain whose links are hooked together, and means for unhooking the links after a predetermined length of the chain is fed into the guide.

39. In a machine of the character described, a guide having a passage for a continuous chain whose links are hooked together, and means for unbending one hook of the chain after a predetermined length of the chain is fed into the guide, and for disengaging said hook from the adjacent link to sever the chain.

40. In a machine of the character described, a guide having a passage for a continuous chain whose links are hooked together, means for unbending one hook of the chain after a predetermined length of the chain is fed into the guide, and for disengaging said hook from the adjacent link to sever the chain, and means engageable with the last-mentioned link for holding it while the hook is being disengaged therefrom.

41. In a machine of the character described, a guide having a passage for a continuous chain whose links are hooked together, and a device for severing the chain including a chisel engageable with the hook of one link for unbending said hook and disengaging it from the adjacent link.

42. In a machine of the character described, a guide having a passage for a continuous chain whose links are hooked together, and a device for severing the chain including a lever, and a chisel pivoted to the lever to slide along one link for prying up the hook thereof and disengaging it from the adjacent link.

43. In a machine of the character described, a guide having a passage for a continuous chain whose links are hooked together, a device for severing the chain including a chisel engageable with the hook of one link for unbending said hook and disengaging it from the adjacent link, and means operated by said device for engaging the last-mentioned link to hold it during the disengagement of the hook therefrom.

44. In a machine of the character described, a guide having a passage for a continuous chain whose links are hooked together, a device for severing the chain including a lever and a chisel pivoted to the lever to slide along one link for prying up the hook thereof and disengaging it from the adjacent link, and means operated by said device for engaging the last-mentioned link to hold it during the disengagement of the hook therefrom.

45. In a machine of the character described, a guide having a passage for the reception of a continuous chain whose links are hooked together, a device for severing the chain embodying a lever fulcrumed to the guide and a chisel pivoted to the lever and whose sharp end is movable along one link of the chain to unbend the respective hooks and disengage it from the adjacent link, and means for swinging the chisel away from the chain when it is returned to initial position.

46. In a machine of the character described, a guide having a passage for the reception of a continuous chain whose links are hooked together, a device for severing the chain embodying a lever fulcrumed to the guide and a chisel pivoted to the lever and whose sharp end is movable along one link of the chain to unbend the respective hook and disengage it from the adjacent link, the guide having a shoulder for the engagement of the butt end of the chisel when the chisel is moved to initial position, whereby the chisel is swung away from the chain.

47. In a machine of the character described, a guide having a passage for the reception of a continuous chain whose links are hooked together, a device for severing the chain having means for unbending the hook of one link and disengaging it from the adjacent link, and a plunger operated by said device for engaging and holding the last-mentioned link during the disengagement of said hook.

48. In a machine of the character described, a guide having a passage for the reception of a continuous chain whose links are hooked together, a lever fulcrumed to the guide, a chisel pivoted to the lever, means for swinging the chisel away from the chain when the chisel is in normal position, the free end of the chisel being movable along one link when the lever is swung so as to pry up and disengage the respective hook from the adjacent link, and a plunger operated by said lever and having means for engaging the last-mentioned link to hold it during the disengagement of the hook therefrom.

49. A chain-fabric assembling machine embodying a guide having a longitudinal passage and transverse passages for the passage of cross chains, means for feeding a continuous chain into said longitudinal passage, and means for stopping the feeding of the continuous chain embodying an operating member projecting into said longitudinal passage to be operated by said chain.

50. A chain-fabric assembling machine, embodying a guide having a longitudinal passage and transverse passages for the passage of cross chains having hooks, means for feeding a continuous chain in said longitudinal passage, means for stopping the feeding means when a predetermined length of chain has entered the longitudinal passage and including a plunger projecting into said passage to be moved by the chain, means for severing the continuous chain when the feeding means is stopped to provide a longitudinal chain carried by the guide, means for moving the guide and cross chains relative to one another to engage the longitudinal chain in the hooks of the cross chains, and means for bending the hooks to embrace the longitudinal chain.

51. A chain-fabric assembling machine embodying a mechanism for delivering a continuous chain, a guide movable transversely into and out of alinement with the said mechanism and having a longitudinal passage for receiving the continuous chain when the guide is in alinement with said mechanism and having transverse passages for the passage of cross chains having hooks, means for stopping said mechanism when a predetermined length of chain is delivered into said longitudinal passage, means for severing the continuous chain to provide a longitudinal chain carried by the guide, means for moving the guide transversely to bring the longitudinal chain into the hooks of the cross chains, and means for bending said hooks to embrace the longitudinal chain.

In testimony that I claim the foregoing as my own, I have hereto affixed my signature in the presence of two witnesses.

GARY B. SMITH.

Witnesses:
IVY E. SIMPSON,
PHILOMENA A. ROCKELLI.

Copies of this patent may be obtained for five cents each, by addressing the "Commissioner of Patents, Washington, D. C."